United States Patent [19]
Tarlow et al.

[11] Patent Number: 4,768,819
[45] Date of Patent: Sep. 6, 1988

[54] COMBINATION BARBEQUE FORK AND SPATULA TOOL

[75] Inventors: Kenneth A. Tarlow, Playa del Rey, Calif.; Gary A. Zimmerman, 1695 Mission St., San Francisco, Calif. 94103

[73] Assignee: Gary A. Zimmerman, San Francisco, Calif.

[21] Appl. No.: 129,043

[22] Filed: Dec. 7, 1987

[51] Int. Cl.[4] .............................. A47J 43/28
[52] U.S. Cl. ..................... 294/7; 294/19.1; 294/104
[58] Field of Search ........ 294/2, 3, 7, 8, 8.5, 294/9–11, 19.1, 22–24, 50.9, 51, 103.1, 104, 115; 7/110, 112; 30/137, 142; 99/394, 426, 441

[56] References Cited

U.S. PATENT DOCUMENTS

| | | | |
|---|---|---|---|
| Re. 7,995 | 12/1887 | Poole | 30/137 |
| 26,393 | 12/1859 | Dunbar | 294/2 X |
| 198,313 | 12/1887 | Poole | 294/104 |
| 950,835 | 3/1910 | Bonin | 30/134 |
| 1,326,570 | 12/1919 | Burmeister | 294/8 |
| 1,532,020 | 3/1925 | Angelides | 294/104 |
| 1,979,432 | 11/1934 | Zander | 294/50.9 |
| 2,031,183 | 2/1936 | Sonnenburg | 294/7 |
| 2,517,275 | 8/1950 | Bartrug | 294/104 |
| 2,643,907 | 6/1953 | Thomas | 294/7 |
| 2,905,498 | 9/1959 | Lunde | 294/191 |
| 3,761,120 | 9/1973 | Binkert | 294/8 |

Primary Examiner—Johnny D. Cherry
Attorney, Agent, or Firm—Poms, Smith, Lande & Rose

[57] ABSTRACT

A combination barbeque fork and spatula tool which can be inserted under a food item with an upper pivoted pointed or barbed portion that can grasp the food item so it can be picked up and turned over or removed.

7 Claims, 3 Drawing Sheets

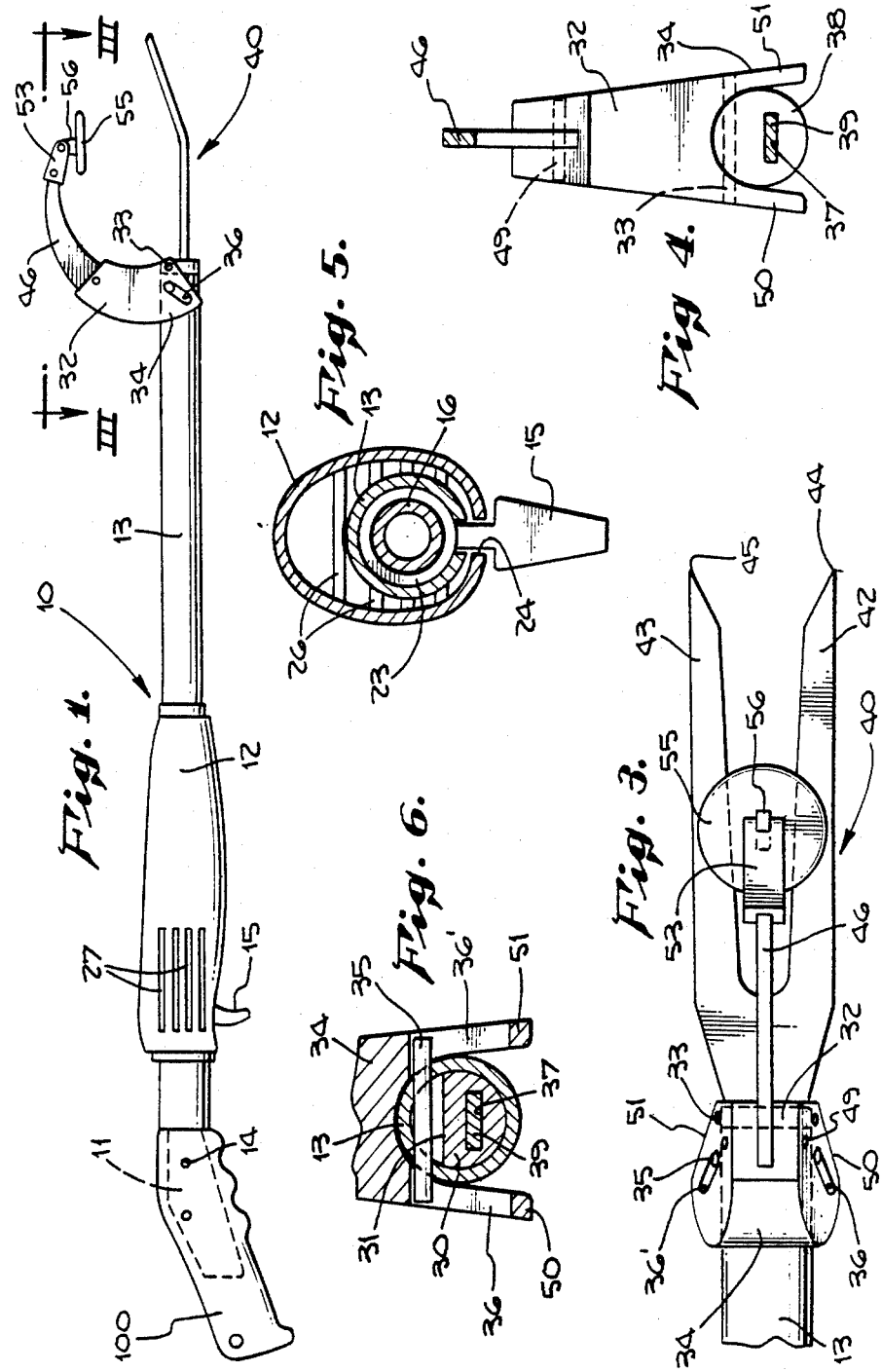

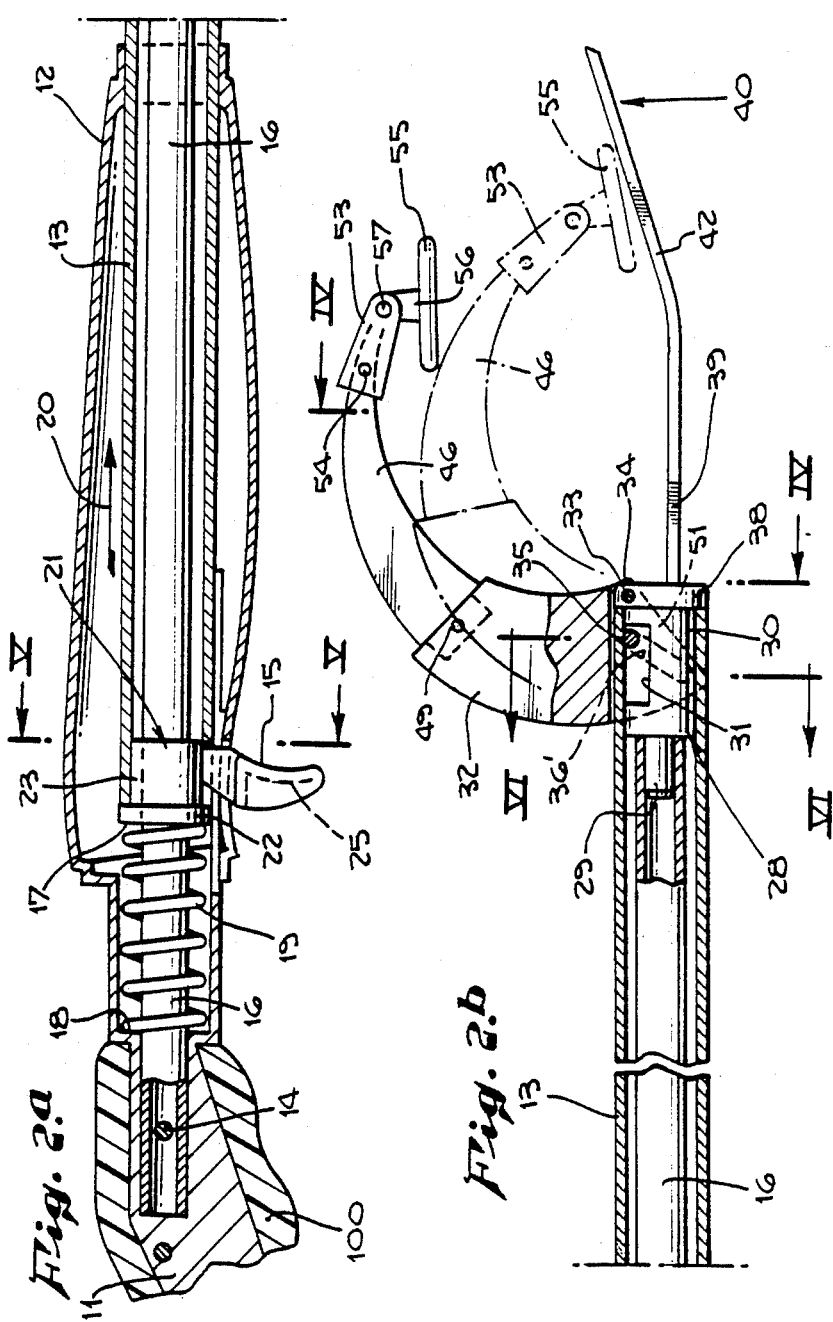

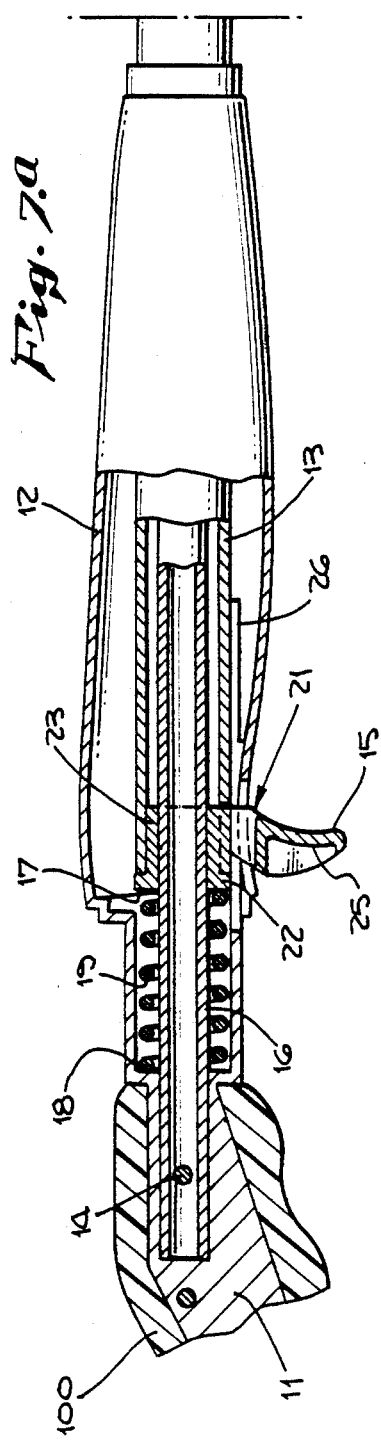
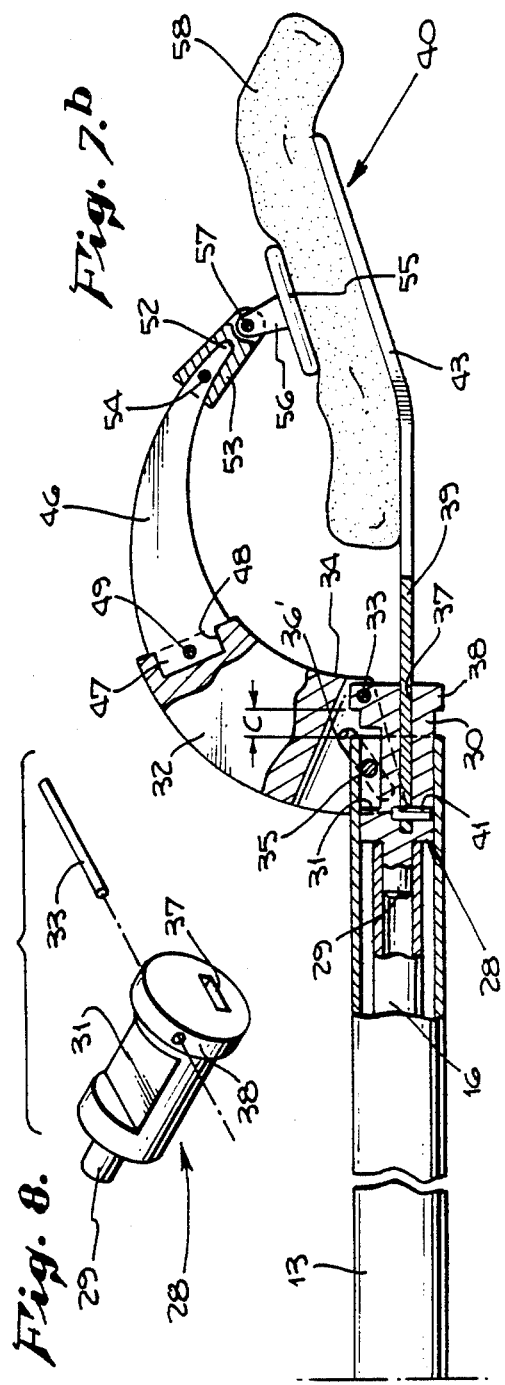

COMBINATION BARBEQUE FORK AND SPATULA TOOL

BACKGROUND OF THE INVENTION

1. Field of the Invention

The invention relates to barbeque tools; and, more particularly to a combined barbeque fork and spatula.

2. Description of the Preferred Embodiment

Barbeque tools are quick handy in turning over and removing steaks, chops, and the like when barbecuing. Unfortunately, some meats are so soft, such as hamburgers, that a fork cannot be used. Also, although a spatula can be used to turn over the meat patty, it cannot be easily used to remove it. A fork can be used to puncture tougher meats, such as chops. However, it is cumbersome to turn over such meats with a fork and it is difficult to remove them from the grill with a spatula or fork.

Of course, a fork and spatula can be used in combination to turn over or remove such meats from a grill. However, the use of both utensils at the same time is awkward and of course two separate items are needed. Further, such tools, even if used simultaneously do not actually grasp the meat. There is thus a need for a combination barbeque fork and spatula which can be used to pick up and turn over meats of varying texture, or used to remove the same from the grill.

SUMMARY OF THE INVENTION

It is an object of this invention to provide a combination barbeque fork and spatula.

It is a further object of this invention to provide such a tool having a pivoting tine or barb which can puncture the meat and hold it to the tool.

It is still another object of this invention to provide a tool in accordance with the foregoing objects which is easy to use, streamlined in appearance and inexpensive to manufacture.

These and other objects are preferably accomplished by providing a combination barbeque fork and spatula which can be inserted under a food item with an upper pivoted pointed or barbed portion that can grasp the food item so it can be picked up and turned over or removed.

BRIEF DESCRIPTION OF THE DRAWING

FIG. 1 is an elevational view of a combined fork and spatula barbeque tool in accordance with the teachings of the invention;

FIGS. 2a and 2b are elevational views, partly in section, of the left and right sides, respectively, of the tool of FIG. 1;

FIG. 3 is a view taken along lines III—III of FIG. 1;
FIG. 4 is a view taken along lines IV—IV of FIG. 2b;
FIG. 5 is a view taken along lines V—V of FIG. 2a;
FIG. 6 is a view taken along lines VI—VI of FIG. 2b;
FIGS. 7a and 7b are elevational views, partly in section, of the left and right sides of the tool of FIGS. 1 to 6 illustrating operation thereof; and
FIG. 8 is a perspective exploded view of two components of the tool of FIGS. 1 to 7.

DESCRIPTION OF THE PREFERRED EMBODIMENT

Referring now to FIG. 1 of the drawing, a combined fork and spatula barbeque tool 10 is shown having a stock 11 (see also FIG. 2a), a trigger housing 12 and a barrel 13. As seen in FIG. 2a, stock 11 and housing 12 may be of one integral piece. Barrel 13 is an elongated hollow tube having a trigger 15 secured thereto with an elongated inner tube 16 of a lesser outer diameter than barrel 13 and terminating interiorly of stock 11 and secured thereto by pin 14. A shoulder 18 is provided at the junction of stock 11 and trigger housing 12. As seen in FIGS. 2a and 7a, trigger 15 is an integral part of a plug 21 fitting into the open rear end of barrel 13 with inner tube 16 extending therethrough, the end wall 22 of the plug 21 being of a larger outer diameter than the generally cylindrical portion 23 of plug 21 thus forming a stop and a shoulder 17 on the outside thereof. Trigger 15 extends out of a slot 24 (see also FIG. 5) formed in the bottom of trigger housing 12 and may have a cut out area 25 for appearance. Strengthening ribs 26 (FIG. 5) may be provided on the inner wall of housing 12 and decorative ribs 27 (FIG. 1) may be provided on the outer wall of housing 12. A coil spring 19 surrounds inner tube 16 between shoulders 17 and 18 normally biasing barrel 13 in the direction of arrow 20.

As seen in FIGS. 2b, 7b and 8, a plug 28 having a small cylindrical portion 29 and a large integral cylindrical portion 30 of greater diameter than portion 29 is slidably inserted into the forward open end of inner tube 16 (see particularly FIG. 7b). A head 38 also generally cylindrical and of larger outer diameter than portion 30 is provided at the end of plug 28. Plug 28 has a notched out area 31 (see particularly FIG. 8) and an arcuate yoke-shaped bracket 32 (see particulary FIG. 4) is pivotally connected to head 38 of plug 28 at pivot pin 33. As seen in FIG. 1, the yoke portion 34 straddles opposite sides of barrel 13.

A pin 35 is fixedly mounted on the inner wall of barrel 13 (see particularly FIGS. 2b and 7b) and movable within notched area 31. Pin 35 rides within a pair of slots 36, 36' (see particularly FIG. 6) provided in each of the legs 50, 51, respectively, of yoke 34 (see also FIG. 3). Thus, when barrel 13 is moved opposite the direction of arrow 20 in FIG. 2a, slot 36 rides along the pin 35 from the solid line position shown in FIG. 2b to the dotted line position in FIG. 2b (or the solid line position in FIG. 7b) while pivoting about pin 33.

As seen in FIG. 8, a slot 37 is formed in the plug 28 receiving therein a flat elongated tongue 39 (FIG. 7b) of a spatula 40. A pin 41 extends through tongue 39 and portion 30 of plug 28 to secure tongue 39 to plug 28. Spatula 40, as seen in FIG. 3, is a claw or fork-like member terminating in spaced flat tines 42, 43 having sharpened pins 44, 45 respectively. As seen in FIG. 2b, tines 42, 43 may angle upwardly from the horizontal as shown.

As seen in FIGS. 1, 2, 3 and 4, a food holding member 46 is fixedly secured to the upper end of bracket 32. Member 46 has a terminal reduced width end 47 (FIG. 2b) receivable in a slot 48 (FIGS. 2b and 7b) in the upper end of bracket 32 and retained thereto by cross-pin 49.

As seen in FIG. 7b, member 46 tapers to an apex 52 receivable in a flat tapered cone shaped member 53 (see also FIG. 3), retained thereto by cross-pin 54. Member 53 may of course be secured to member 46 in any suitable manner. A food holding plate 55, which may be circular, see FIG. 3, has an integral flange 56 pivotally connected via cross-pin 57 to the apex of member 53. The movement between plate 55 and member 53 may be relatively stiff so that the angularity of plate 55 to member 53 can be varied but sufficient support is provided when plate 55 is used to grasp food items or the like.

Thus, in operation, tines 42, 43 are slid or inserted under a food item, such as the meat patty 58 shown in FIG. 7b, thus using the same as a spatula, then trigger 15 is pulled back moving barrel 13 from the FIG. 2b to the FIG. 7b position pivoting member 46 from the solid line position shown in FIG. 2b to the solid line position shown in FIG. 7b (distance C in FIG. 7b) thus grasping patty 58 between plate 55 and spatula 40. The patty 58 can now be removed from the grill or the like or turned over. Release of trigger 15 allows spring 19 to return barrel 13 to the FIG. 2b position and thus member 46 to the solid line position shown in FIG. 2b. Of course, other food items can be quickly and easily grasped and handled in like manner. The sharp points 44, 45 allow the spatula to be used as a fork to pierce meat or the like and can be used as such without use of holding plate 55.

The tool 10 thus serves as a combined barbeque fork, spatula and food holder in a streamlined tool that is easy to use and inexpensive to manufacture. Obviously, any suitable materials may be used and the invention is not to be limited by the description set forth herein, since obvious modifications may occur to an artisan, but the scope of the invention is to be determined by the appended claims.

We claim:

1. A combined barbeque fork and spatula tool comprising:
   a main housing;
   an elongated hollow barrel extending through said housing and out of one end of said main housing;
   an elongated rod having one end fixed to said housing extending through said barrel;
   a trigger connected to said barrel;
   biasing means associated with said housing and said barrel for biasing said barrel for lateral movement with respect to said rod;
   a spatula fixedly secured to the forward end of said rod; and
   a food holding member connected to the forward end of said barrel, said food holding member terminating in a planar member, and pivoting means associated with said barrel, said rod and said food holding member whereby said spatula may be inserted under a meat patty or the like and said trigger may be pulled to move said barrel against said biasing means pivoting said food holding member into a position adjacent said spatula for clamping a meat patty or the like therebetween.

2. In the tool of claim 1 wherein said spatula is a fork having a plurality of spaced tines.

3. In the tool of claim 1 wherein said spatula includes a first planar portion extending generally parallel to the center axis of said rod with a second planar portion integral with said first planar portion extending upwardly and away from said first planar portion at an angle thereto.

4. In the tool of claim 1 wherein said food holding member includes a flat plate at the free end thereof presenting a flat surface lying in a plane generally parallel to the center axis of said rod when said food holding member is disposed in a position away from said spatula.

5. In the tool of claim 1 wherein said biasing means is a coiled spring surrounding said rod abutting against the inside of said housing at one end and against said barrel at the other end.

6. In the tool of claim 1 wherein said food holding member includes a yoke portion straddling said barrel, said pivoting means including a pin extending through said barrel and said yoke portion.

7. In the tool of claim 6 wherein said pivoting means further includes at least one elongated slot in said yoke portion, a pin mounted on the inner wall of said barrel adjacent said slot, a slot in the end of said rod adjacent said first mentioned slot, and said last-mentioned pin extending through said slots wherein said last-mentioned pin rides in said slots when said food holding member is pivoted.

* * * * *